United States Patent [19]
Sheets

[11] Patent Number: 5,695,834
[45] Date of Patent: *Dec. 9, 1997

[54] METHOD FOR MAKING LIQUID CRYSTAL-COATED THERMOCHROMIC WRITING INSTRUMENTS

[75] Inventor: Jeffrey D. Sheets, Plano, Tex.

[73] Assignee: J.R. Moon Pencil Co., Inc., Lewisburg, Tenn.

[*] Notice: The term of this patent shall not extend beyond the expiration date of Pat. No. 5,618,581.

[21] Appl. No.: 673,146

[22] Filed: Jul. 1, 1996

[51] Int. Cl.⁶ .................. B05D 1/38; C09K 19/00; A63H 33/00
[52] U.S. Cl. .................. 428/1; 427/407.1; 427/402; 427/333; 427/372.2; 446/14; 401/195
[58] Field of Search .................. 427/257, 407.1, 427/402, 372.2, 258; 401/5, 16, 252, 195; 446/14; 428/240, 1

[56] References Cited

U.S. PATENT DOCUMENTS

| | | | |
|---|---|---|---|
| 4,045,383 | 8/1977 | Koff | 260/8 |
| 4,070,497 | 1/1978 | Wismer et al. | 427/44 |
| 4,425,161 | 1/1984 | Shibahashi et al. | 106/21 |
| 5,076,841 | 12/1991 | Chen et al. | 106/1.25 |
| 5,141,156 | 8/1992 | Hoy et al. | 239/135 |
| 5,194,183 | 3/1993 | Munch et al. | 252/586 |
| 5,242,617 | 9/1993 | Metzger et al. | 252/299.5 |
| 5,376,699 | 12/1994 | Sage | 523/206 |
| 5,618,581 | 4/1997 | Sheets | 427/257 |

*Primary Examiner*—Shrive Beck
*Assistant Examiner*—Michael Barr
*Attorney, Agent, or Firm*—Dowell & Dowell

[57] ABSTRACT

A method for making liquid crystal-coated thermochromic writing instruments includes the steps of: coating the writing instruments with liquid crystals; curing the coated writing instruments; coating the writing instruments with a colloidal lacquer; curing the coated writing instruments; coating the writing instruments with a nitrocellulose lacquer; and curing the coated writing instruments.

23 Claims, 1 Drawing Sheet

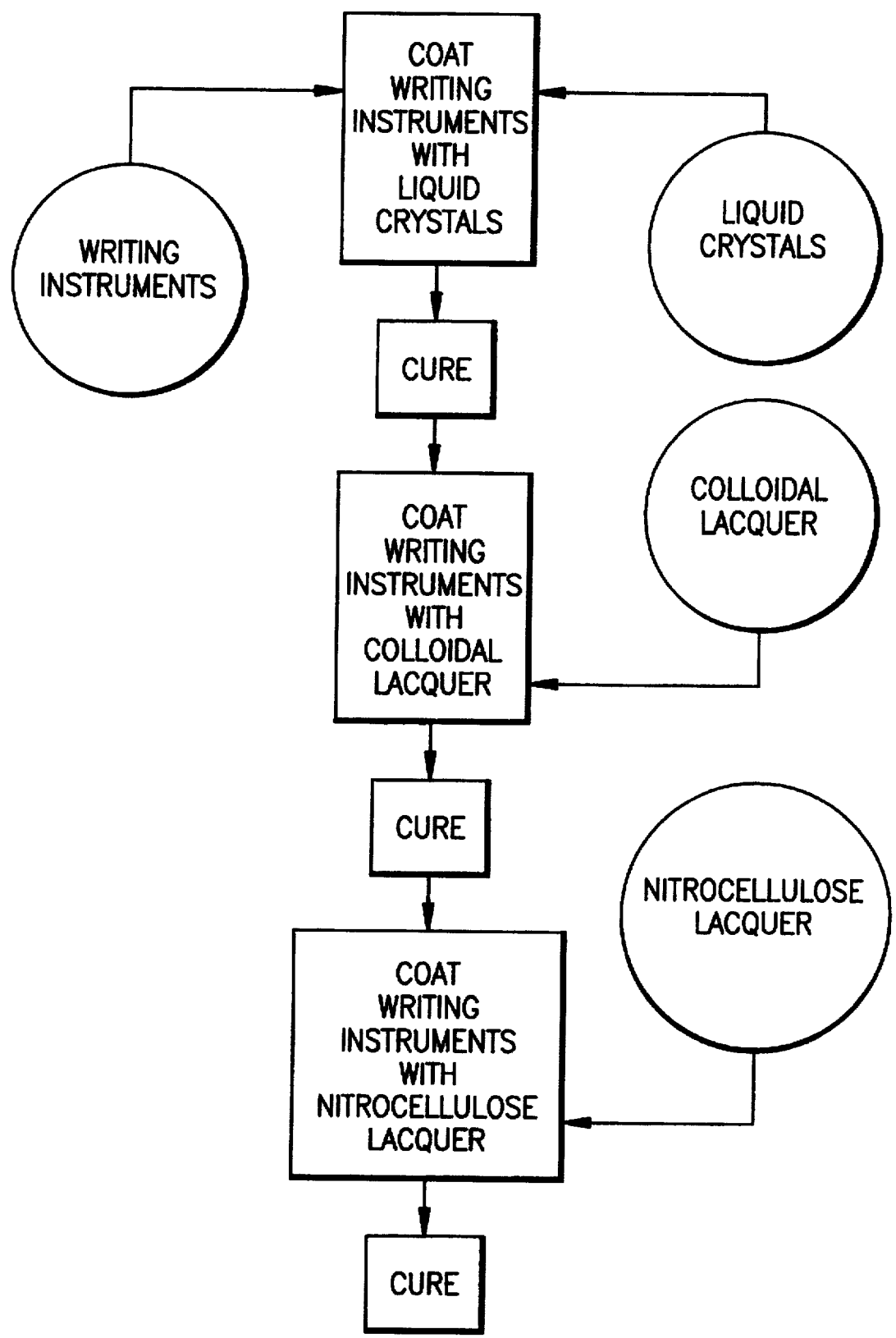

METHOD FOR MAKING LIQUID CRYSTAL-COATED THERMOCHROMIC WRITING INSTRUMENTS

TECHNICAL FIELD OF THE INVENTION

This invention relates generally to writing instruments, and more particularly, to a method for making liquid crystal-coated thermochromic writing instruments.

BACKGROUND OF THE INVENTION

Historically, writing instruments such as pens and pencils have been manufactured where the caps and/or barrels have various colors and designs on them. These different colors and designs are typically painted or printed on the pens and pencils.

Another type of instrument available in the industry is a "wrapped" writing instrument. Wrapped pens and pencils include patterns that create interesting optical and illusionary effects. These wraps are sometimes called foil wraps because the pens and pencils are actually wrapped in printed foil.

Recently, thermochromic writing instruments have become available on a very limited basis. The term thermochromic generally refers to the chemical property of changing color based on heat. Thermochromic pens and pencils change color based on the application of heat to the pen or pencil, e.g., the heat from one's hand. Thermochromic writing instruments may be manufactured in two ways: (1) with a thermochromic coating topically applied to the pens and pencils; or (2) by injection molding, with thermochromic pigments dispersed in the plastic prior to injecting.

Applicant is aware of only two companies that offer thermochromic writing instruments. They are Bic Corporation, which manufactures injection-molded thermochromic pens, and Calladium Corporation, the Applicant, which offers thermochromic writing instruments manufactured with coatings. The injection molding method may be used only with pens, while the coating method may be used to manufacture pens and pencils.

Different materials may be used to manufacture thermochromic writing instruments having topically applied coatings. For example, the writing instruments may be coated with thermochromic pigments dispersed in a lacquer base, as described more fully in a patent application entitled "Method for Making Thermochromic Writing Instruments Using Topically Applied Thermochromic Pigments," application Ser. No. 08/519,918, filed on Aug. 28, 1995. Alternatively, the writing instruments may be coated with liquid crystals and various protective lacquers, as described in more detail herein. The writing instruments may have a different texture, as described more fully in a patent application entitled "Method For Making Thermochromic Writing Instruments Having a Reptilian Texture," application Ser. No. 08/673,145, filed on Jul. 1, 1996.

While the above-described prior art writing instruments have merit, there are disadvantages associated with each. This is true for the non-color changing writing instruments. Children often become bored with "plain" pens and pencils that can't "do" anything. Similarly, foil-wrapped pens and pencils are less appealing than interactive, thermochromic writing instruments.

Color-changing prior art writing instruments also have disadvantages. Thermochromic writing instruments made with injection molding are very slow to respond to the application of heat, and can only change two colors. An injection-molded thermochromic pen might require in excess of forty-five (45) seconds to react to the holder's body heat and change color. In addition, due to the injection molding manufacturing process, the thermochromic pigment must be microencapsulated with thick walls. The thick walls further retard the ability of the writing instrument to change the pigment color in response to applied heat. In addition, the pens manufactured with an injection molding process often have a dull or muted color that is less appealing to children.

While topically applied, thermochromic pigment-containing writing instruments change color faster than injection-molded thermochromic writing instruments, topically applied thermochromic writing instruments are not as responsive as desired. In addition, the topically applied thermochromic pigments are only capable of changing between two chemical states (i.e., active and inactive), thus providing only two distinct colors.

Thus, there is a need for a method for making liquid crystal-coated writing instruments that change color very quickly in response to heat and that change up to five (5) colors, depending on the base color used.

SUMMARY OF THE INVENTION

The present invention comprises a method for making liquid crystal-coated thermochromic writing instruments that overcomes the disadvantage associated with the prior art methods and writing instruments. The method of the present invention comprises the steps of: topically applying a liquid crystal coating having a particular viscosity to the writing instruments; curing the coated writing instruments; topically applying a colloidal lacquer having a particular viscosity to the writing instruments; curing the coated writing instruments; topically applying a nitrocellulose lacquer having a particular viscosity to the writing instruments; and curing the coated writing instruments.

BRIEF DESCRIPTION OF THE DRAWINGS

For a more complete understanding of the present invention and the advantages thereof, reference is now made to the following Detailed Description of the Invention, taken in conjunction with the accompanying FIGURE, which is a flow chart illustrating the steps in the method for making liquid crystal-coated thermochromic writing instruments according to the present invention.

DETAILED DESCRIPTION OF THE INVENTION

Thermochromic refers to the property of changing color based on heat. Liquid crystal coatings have the ability to refract each color band or wavelength that is present in the base color on which the liquid crystal coating is applied. For example, consider liquid crystals applied to a black background. At approximately each 3° Celsius interval, the following colors will be refracted: black (inactive), amber (+3° C.), green (+6° C.), blue (+9° C.) and purple (+12° C.). If the base color was red, rather than black, the base color would contain fewer refractable colors because red contains fewer color bands or wavelengths than black.

It is possible to chemically vary the liquid crystal coating to facilitate the starting point where color band refraction begins occurring. This chemical variation can be accomplished at temperatures between 0° Celsius and 50° Celsius. To make liquid crystal-coated thermochromic writing instruments, the starting temperature should range from 15° Celsius to 30° Celsius.

The method of the present invention uses three basic materials. They include liquid crystals, a colloidal lacquer and a nitrocellulose lacquer.

The liquid crystal coating used in the method of the present invention is a water-based, elastomeric polymer. Liquid crystal coatings are available from a number of domestic and international sources, such as Davis Liquid Crystals of San Leandro, Calif.

Liquid crystals are highly sensitive to changes in pH and they degrade when they come in contact with most solvents. It is therefore desirable to apply a protective coating over the liquid crystal layer to protect the liquid crystals. The method of the present invention uses a colloidal lacquer for this step. The colloidal lacquer forms a semi-hard, lipophobic, protective barrier on top of the liquid crystal coating. A water-based lacquer is preferable. Such a lacquer is available from Davis Liquid Crystals of San Leandro, Calif., Product #32.

When applied to liquid crystals, a colloidal lacquer does not form a film, like an emulsion. Thus, it is necessary to apply another protective coating over the colloidal lacquer. An emulsion-type lacquer is preferred. Many resins may be used for this step of the method of the present invention, including various acrylics and polyurethanes. However, a water-based, nitrocellulose lacquer is preferred. A suitable nitrocellulose lacquer may be obtained from Tennessee Technical Coatings of Lewisberg, Tenn.

The thickness of the coatings, both in wet form and dry form, is critical to the optical effects produced by the above-identified coatings. It is essential that a very consistent amount of coating is applied during each coating step. The coatings may be applied to the writing instruments using a dip coating, gasket coating or spray coating method. The preferred method for coating the writing instruments is the dip coating method, but the gasket and spray coating methods may also be used.

The curing step is the same for each of the application methods. The method of the present invention will be described using the dip coating method, and the specific departures for the gasket and spray coating methods will be described. It will be understood, however, that any of the methods may be used to manufacture the liquid crystal-coated thermochromic writing instruments of the present invention.

When using the dip coating method, the writing instruments to be coated are placed on a rack or a similar device. The device selected should be efficient from a production standpoint. The writing instruments should not be clustered so tightly on the rack that the writing instruments have poor air circulation during the curing step. A rack having a dimension of 10"×17" provides adequate air circulation for the writing instruments.

The rack is typically constructed of ⅜" plywood or like material. A composite material mat is affixed to the rack. The mat contains 150 receptacles for receipt of the writing instruments. Each receptacle is approximately ⅜" high. Each receptacle may have varying diameters that will accommodate varying sizes of writing instruments. The mat may be pour molded and is available from numerous molding houses, such as Eraser Products of Lewisberg, Tenn.

The type of writing instrument to be coated affects how the writing instrument is positioned on the rack. For example, a complete pencil (e.g., a pencil with eraser and ferrule) may be placed directly in the mat using the eraser end. This placement allows the pencil to be dipped to a predetermined level without getting any excess material on the ferrule.

Placement in the rack is different for pens. Some pen caps and pen barrels must be placed onto polybutyrate holders. Thereafter, the polybutyrate holders are placed in the receptacles on the mat. The pen components are held approximately 1" above the mat by the polybutyrate holders. Other pen caps and pen barrels may be placed directly into the receptacles without using polybutyrate holders.

After the writing instruments are positioned in the rack, the dipping step may begin. The writing instruments must be dipped evenly and consistently into a container of the appropriate coating. The coating must remain well blended in the container throughout the dipping step. The dipping step is preferably accomplished by using a dipping machine available in the industry.

A dipping machine typically consists of an angle frame with a pneumatic cylinder attached to the frame. The pneumatic cylinder regulates the rate of ascent and descent of the writing instruments into and out of the container. A dipping machine typically holds up to three (3) of the 150-piece racks. In this manner, 450 writing instruments may be coated simultaneously.

Certain factors affect the thickness of the coating applied to the writing instruments using the dip coating method. They include: (1) the viscosity of the material; and (2) the rate of withdrawal of the writing instruments from the container. The higher the viscosity of the material (i.e., thicker), the more material is applied at a given withdrawal rate. The faster the rate of withdrawal, the more material is applied at a given viscosity. Following is the acceptable ranges of viscosity and withdrawal rates for each of the coatings used in the method of the present invention.

| Coating | Viscosity | | Withdrawal Rate |
| --- | --- | --- | --- |
| | (Zahn #2) | (Zahn #4) | |
| Liquid Crystals | 13–25 sec. | — | .005" - .250"/sec. |
| Colloidal Lacquer | 13–25 sec. | — | .005" - .250"/sec. |
| Nitrocellulose Lacquer | — | 12–26 sec. | .005" - .250"/sec. |

Although the viscosity range for liquid crystals is 13–25 seconds, the preferred viscosity of the liquid crystals is 19 seconds on a Zaire #2 viscometer. The preferred withdrawal rate during the liquid crystals coating step is 0.005–0.250 inches per second. The preferred viscosity of the colloidal lacquer is 19 seconds on a Zahn #2 viscometer. The preferred withdrawal rate during the colloidal lacquer coating step is also 0.005–0.250 inches per second. Finally, the preferred viscosity of the nitrocellulose lacquer is 16 seconds on a Zahn #4 viscometer and the preferred withdrawal rate during the nitrocellulose lacquer coating step is 0.005–0.250 inches per second.

Using the above-identified viscosities and withdrawal rates will provide an adequate wet film thickness during each coating step. The number of coatings required to achieve a desired coating thickness may vary based on climatic conditions. A final thermochromic coating thickness of 0.5–5.0 mils is preferred.

As noted above, two additional methods may be used to apply the liquid crystals, colloidal lacquer and nitrocellulose lacquer coatings: (1) the gasket coating method; and (2) the spray coating method.

The gasket coating method is a well-known method used to apply various lacquers to writing instruments, including pencils. The gasket coating method uses a rubber gasket, or another suitable flexible composite material, to remove excess lacquer that is applied to the writing instrument. Lacquer is applied and excess lacquer is removed multiple times until the lacquer has built up a sufficient thickness to provide the desired color and finish on the writing instrument.

If a gasket coating process is used in the method of the present invention, the standard lacquer is replaced with a water-based liquid crystal coating, a colloidal lacquer and a nitrocellulose lacquer. Liquid crystals are larger in size (generally 5–15 microns) than standard pigment lacquers. Accordingly, a slightly larger gasket must be used to coat the writing instruments. The gasket should be 0.005"–0.015" larger than the standard gasket used for a standard pencil size, as outlined by the Pencil Manufacturer's Association.

The three coatings may also be applied to the writing instruments using a spray coating method. It is preferable to use a high-volume, low-pressure (HVLP) system with a fine-spray nozzle. A system such as the Binks Mach I HVLP system with pressure pots is adequate for this operation.

To coat the writing instruments using a high-volume, low-pressure system, it is necessary to use a predetermined amount of air pressure combined with a specific spraying technique. The preferred air pressure is 40–95 psi. The optimum spraying technique is a steady and even spraying motion until filming occurs. It is desirable to apply the liquid crystals and protective lacquers so that the coatings will dry to a final coating thickness of 0.5–5.0 mils. It should be noted that the spray coating method is more difficult to control than the other coating methods.

After applying each of the coatings to the writing instruments, as described above, the coated writing instruments must be cured before applying a subsequent coating. The writing instruments may not be fully cured, but they must be dry to the touch.

The following description of the curing step applies to each of the coating methods. That is, whether using the dip coating, gasket coating or spray coating method, the writing instruments must be cured between each coating application.

The writing instruments may be air dried or dried in warm air. While the writing instruments may be air dried, it is more efficient and cost effective to cure the writing instruments using warm air. If warm-air curing is selected, the temperature must be less than 60° Celsius.

A drying tunnel may be used to provide warm air flow for the curing process. Using warm air dramatically accelerates the curing process when compared to air-dry curing. The preferred drying configuration is a continuously running conveyor with a drying tunnel on top. Using this layout, writing instruments may be coated using one of the three methods described above.

If the dip coating or spray coating method is used, groups of writing instruments in the racks are positioned on a conveyer. If the gasket coating method is used, each individual writing instrument is placed on the conveyor and the writing instrument proceeds through the drying tunnel until that writing instrument is cured.

It is desirable to use three separate drying "lines" or cycles during production of the liquid crystal-coated thermochromic writing instruments. First, the liquid crystal coating will be applied to the writing instruments and the coated instruments will be cured along a first drying line. Then, colloidal lacquer will be applied to the coated writing instruments and the coated writing instruments will be cured on a second line. Finally, nitrocellulose lacquer will be applied to the writing instruments and the coated writing instruments will be cured on a third drying line.

During the curing step, it is critical to control temperature and the speed of the conveyor. The preferred temperature range to be maintained is 46° C.–57° C. At temperatures above 65.5° C., the liquid crystals are highly susceptible to dying due to heat. If the liquid crystals die, they will be unable to refract color bands and will provide no thermochromic effect.

In the above-described temperature range, the writing instruments will require approximately twenty (20) minutes of continuous curing for each curing cycle in order to be dry to the touch. External climactic conditions may also affect the cure time.

In summary, the following steps are performed during the method for making liquid crystal-coated thermochromic writing instruments of the present invention. First, the writing instruments are placed in composite material racks. Next, liquid crystals are topically applied to the writing instruments. The viscosity of the liquid crystals and the withdrawal rate must be consistent with the levels indicated above.

Following the first coating step, the racks containing the writing instruments are transferred to a conveyor and sent into a drying tunnel. Warm air between 46° C. and 57° C. passes over the writing instruments for approximately twenty (20) minutes. The liquid crystal coating is dry to the touch and is ready to be coated with a colloidal lacquer.

The coated writing instruments are coated with the colloidal lacquer. The viscosity and withdrawal rate for the colloidal lacquer must be as described above. The racks containing the coated writing instruments are transferred to the conveyor. The writing instruments travel through a drying tunnel where warm air (47° C. to 57° C.) passes over the writing instruments for approximately twenty (20) minutes. The colloidal lacquer coating is dry to the touch.

Nitrocellulose lacquer is applied to the coated writing instruments. The racks containing the coated writing instruments are dipped into a container of water-based, nitrocellulose lacquer. The viscosity and withdrawal rate for the nitrocellulose lacquer must be as described above. The coated writing instruments are cured following the final coating.

The method of the present invention produces writing instruments having a smooth, durable, liquid crystal coating. The liquid crystal coating will change colors when heat is applied to the writing instrument, e.g., heat from one's hand.

The method for making liquid crystal-coated thermochromic writing instruments of the present invention has numerous advantages over the prior art writing instruments and methods. For example, the thermochromic writing instruments manufactured according to the present invention respond more quickly to heat than prior art thermochromic writing instruments. The writing instruments of the present invention typically change color in less than two (2) seconds, rather than three (3) seconds for pigment-coated writing instruments and forty-five (45) seconds for injection-molded writing instruments.

In addition, the thermochromic writing instruments of the present invention are capable of refracting more colors than the prior art instruments. Liquid crystals reside in a polymer matrix and act much like prisms refracting as many as five color bands, thus showing five different colors. The present invention thermochromic writing instruments may produce as many as five (5) colors, rather than the two (2) colors produced by prior art instruments.

Although preferred and alternative embodiments of the method of the present invention have been illustrated in the accompanying FIGURE and described in the foregoing Detailed Description of the Invention, it will be understood that the invention is not limited to the embodiments disclosed, but is capable of numerous rearrangements, modifications, and substitutions of parts and elements without departing from the spirit of the invention.

I claim:

1. A method for applying a protective thermochromic coating to a surface of a writing instrument, comprising the steps of:

(a) applying a thermochromic liquid crystal coating to the surface of the writing instrument;

(b) thereafter curing said thermochromic liquid crystal coating so as to be dry to touch;

(c) thereafter applying a coating consisting essentially of colloidal lacquer over said thermochromic liquid crystal coating;

(d) thereafter curing the colloidal lacquer coating so as be dry to touch;

(e) thereafter applying a coating consisting essentially of an emulsion lacquer over the colloidal lacquer coating; and thereafter, (f) curing the emulsion coating, so as to be dry to touch to thereby form the protective thermochromic coating.

2. The method of claim 1 wherein said thermochromic liquid crystal coating is water-based.

3. The method of claim 1 wherein said colloidal lacquer coating is water-based.

4. The method of claim 1 wherein said emulsion lacquer coating is a water-based nitrocellulose lacquer.

5. The method of claim 1 wherein each application step is accomplished by dip coating.

6. The method of claim 5 wherein the dip coating of said thermochromic liquid crystal coating is accomplished with a withdrawal rate of 0.005"/second to 0.250"/second.

7. The method of claim 5 wherein the dip coating of said colloidal lacquer coating is accomplished with a withdrawal rate of 0.005"/second to 0.250"/second.

8. The method of claim 5 wherein the dip coating of said emulsion lacquer coating is accomplished with a withdrawal rate of 0.005"/second to 0.250"/second.

9. The method of claim 1 including maintaining a viscosity of said thermochromic liquid crystal coating during the application step in a range from 13 to 25 seconds on a Zahn #2 viscometer.

10. The method of claim 1 including maintaining a viscosity of said colloidal lacquer coating during the application step in the range from 13 to 25 seconds on a Zahn #2 viscometer.

11. The method of claim 1 including maintaining a viscosity of said emulsion lacquer coating during the topical application step in the range from 12 to 26 seconds on a Zahn #4 viscometer.

12. The method of claim 1 wherein each application step is accomplished by spraying.

13. The method of claim 12 wherein the liquid crystals or lacquer are sprayed on the writing instrument by applying pressurized air to the writing instrument.

14. The method of claim 12 wherein each coating is sprayed at pressures from about 40 to 95 psi.

15. The method of claim 1 wherein each application step is accomplished by gasket coating.

16. The method of claim 1 wherein each curing step comprises air drying.

17. The method of claim 16 wherein the air drying occurs at a temperature below 60° C.

18. The method of claim 17 wherein the temperature is between approximately 46° C. and 57° C.

19. The method of claim 1 wherein said emulsion lacquer coating is a nitrocellulose emulsion lacquer.

20. The method of claim 1, wherein the protective thermochromic coating is applied to a thickness of about 0.5 mils to about 5.0 mils.

21. The method of claim 1, wherein said thermochromic liquid crystal coating includes liquid crystals which range in size from about 5 microns to about 15 microns.

22. The method of claim 1, wherein said emulsion lacquer coating is selected from the group of coatings consisting of a polyurethane resin, an acrylic resin, and a nitrocellulose lacquer.

23. A thermochromic writing instrument having a protective thermochromic coating applied to the surface thereof in accordance with the method of claim 1.

* * * * *